US011693747B2

(12) United States Patent
Marripudi et al.

(10) Patent No.: US 11,693,747 B2
(45) Date of Patent: Jul. 4, 2023

(54) ADAPTIVE MULTIPATH FABRIC FOR BALANCED PERFORMANCE AND HIGH AVAILABILITY

(71) Applicant: Samsung Electronics Co., Ltd., Suwon-si (KR)

(72) Inventors: Gunneswara R. Marripudi, Fremont, CA (US); Stephen G. Fischer, Mountain View, CA (US); Zhan Ping, Milpitas, CA (US); Indira Joshi, Saratoga, CA (US); Harry Rogers, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 65 days.

(21) Appl. No.: 16/436,087

(22) Filed: Jun. 10, 2019

(65) Prior Publication Data
US 2019/0294513 A1 Sep. 26, 2019

Related U.S. Application Data

(63) Continuation of application No. 15/344,438, filed on Nov. 4, 2016, now Pat. No. 10,365,981.
(Continued)

(51) Int. Cl.
*G06F 11/00* (2006.01)
*G06F 11/20* (2006.01)
(Continued)

(52) U.S. Cl.
CPC ........ *G06F 11/2025* (2013.01); *G06F 11/201* (2013.01); *G06F 11/2028* (2013.01);
(Continued)

(58) Field of Classification Search
CPC .............. G06F 11/2025; G06F 11/201; G06F 11/2033; G06F 11/2092; G06F 13/4022
See application file for complete search history.

(56) References Cited

U.S. PATENT DOCUMENTS 5,922,077 A 7/1999 Epsy et al.
6,219,753 B1 4/2001 Richardson
(Continued)

FOREIGN PATENT DOCUMENTS

CN 1815979 A 8/2006
CN 102394923 A 3/2012
(Continued)

OTHER PUBLICATIONS

Jun Byunghei et al., "Workload-Aware Budget Compensation Scheduling for NVMe Solid State Drives", http://nyx.skku.ac.kr/wp-content/uploads/2014/07/07304369.pdf, IEEE, 2015, 6 pgs.

*Primary Examiner* — Philip Guyton
(74) *Attorney, Agent, or Firm* — Lewis Roca Rothgerber Christie LLP

(57) ABSTRACT

A computing system providing high-availability access to computing resources includes: a plurality of interfaces; a plurality of sets of computing resources, each of the sets of computing resources including a plurality of computing resources; and at least three switches, each of the switches being connected to a corresponding one of the interfaces via a host link and being connected to a corresponding one of the sets of computing resources via a plurality of resource connections, each of the switches being configured such that data traffic is distributed to remaining ones of the switches through a plurality of cross-connections between the switches if one of the switches fails.

22 Claims, 9 Drawing Sheets

Related U.S. Application Data

(60) Provisional application No. 62/377,487, filed on Aug. 19, 2016.

(51) Int. Cl.
*G06F 13/40* (2006.01)
*G06F 13/42* (2006.01)

(52) U.S. Cl.
CPC ...... *G06F 11/2033* (2013.01); *G06F 11/2035* (2013.01); *G06F 11/2046* (2013.01); *G06F 11/2092* (2013.01); *G06F 11/2094* (2013.01); *G06F 13/4022* (2013.01); *G06F 13/4282* (2013.01)

(56) References Cited

U.S. PATENT DOCUMENTS

| | | | |
|---|---|---|---|
| 6,330,642 B1 | 12/2001 | Carteau | |
| 6,658,478 B1 * | 12/2003 | Singhal | H04L 67/42 709/232 |
| 6,952,734 B1 | 10/2005 | Gunlock et al. | |
| 7,307,948 B2 | 12/2007 | Infante et al. | |
| 7,903,556 B2 | 3/2011 | Lesartre et al. | |
| 8,140,762 B2 | 3/2012 | Jibbe et al. | |
| 8,468,385 B1 | 6/2013 | Balachandriah et al. | |
| 8,521,941 B2 | 8/2013 | Regula | |
| 8,966,098 B2 | 2/2015 | Jibbe et al. | |
| 9,003,090 B1 | 4/2015 | Davis | |
| 9,047,351 B2 | 6/2015 | Riddle et al. | |
| 9,081,691 B1 | 7/2015 | Gupta et al. | |
| 9,110,813 B2 | 8/2015 | Maharana et al. | |
| 9,158,540 B1 | 10/2015 | Tzelnic et al. | |
| 9,285,827 B2 | 3/2016 | Breakstone et al. | |
| 9,921,989 B2 | 3/2018 | Ganapathy et al. | |
| 10,365,981 B2 * | 7/2019 | Marripudi | G06F 11/2035 |
| 2006/0171303 A1 | 8/2006 | Kashyap | |
| 2009/0204743 A1 | 8/2009 | Inoue et al. | |
| 2010/0115319 A1 * | 5/2010 | Chiang-Lin | G06F 1/3203 713/324 |
| 2016/0140003 A1 | 5/2016 | Panara et al. | |
| 2016/0259696 A1 | 9/2016 | Kajiwara et al. | |
| 2018/0027680 A1 * | 1/2018 | Kumar | H04Q 1/09 361/807 |
| 2018/0052745 A1 * | 2/2018 | Marripudi | G06F 11/2046 |

FOREIGN PATENT DOCUMENTS

| | | |
|---|---|---|
| CN | 104965677 A | 10/2015 |
| TW | 201013395 A | 4/2010 |
| TW | 201608378 A | 3/2016 |

\* cited by examiner

ADAPTIVE MULTIPATH FABRIC FOR BALANCED PERFORMANCE AND HIGH AVAILABILITY

CROSS-REFERENCE TO RELATED APPLICATION(S)

This application is a continuation of U.S. patent application Ser. No. 15/344,438, filed Nov. 4, 2016, which claims priority to and the benefit of U.S. Provisional Patent Application No. 62/377,487 "Adaptive Multipath Fabric for Balanced Performance and High Availability," filed in the United States Patent and Trademark Office on Aug. 19, 2016, the entire contents of both of which are incorporated herein by reference.

FIELD

Aspects of embodiments of the present invention relate to the field of providing redundancy to computer systems.

BACKGROUND

In the field of computer systems, reliable and high performance access to data and other computing resources is important for the continued operations of businesses and daily lives. The term "high availability" (HA) is frequently used to describe systems that reduce or eliminate single points of failure (e.g., providing redundancy to the system so that the failure of a single component does not result in the failure of the entire system).

Example computer systems that benefit from high availability include data storage systems such as storage area network (SAN) systems, which may provide data resources for the storage and retrieval of data over a computer network such as a local area network (LAN) or over the internet.

SUMMARY

Aspects of embodiments of the present invention relate to providing balanced performance and high availability to computing resources through the use of an adaptive multipath fabric.

According to one embodiment of the present invention, a computing system providing high-availability access to computing resources includes: a plurality of interfaces; a plurality of sets of computing resources, each of the sets of computing resources including a plurality of computing resources; and at least three switches, each of the switches being connected to a corresponding one of the interfaces via a host link and being connected to a corresponding one of the sets of computing resources via a plurality of resource connections, each of the switches being configured such that data traffic is distributed to remaining ones of the switches through a plurality of cross-connections between the switches if one of the switches fails.

The at least three switches may include: a first switch; a second switch; and a third switch directly connected to the first switch via a first cross-connection and directly connected to the second switch via a second cross-connection.

The computing system may further include: a first server node coupled to the first switch via a first host link, the first server node including a first interface of the plurality of interfaces; and a second server node coupled to the second switch via a second host link, the second server node including a second interface of the plurality of interfaces.

The computing system may further include a third server node coupled to the third switch via a third host link.

The computing system may further include: a first secondary switch directly connected to the first server node; a second secondary switch directly connected to the second server node; a third secondary switch directly connected to the third server node; a first cross-connection directly connecting the first secondary switch to the second secondary switch; a second cross-connection directly connecting the first secondary switch to the third secondary switch; and a third cross-connection directly connecting the second secondary switch to the third secondary switch.

A first set of computing resources of the plurality of sets of computing resources may include a first set of data storage devices, each of the first set of data storage devices having a first port directly connected to the first switch via a first resource connection of the plurality of resource connections and a second port directly connected to the second switch via a second resource connection of the plurality of resource connections, and a second set of computing resources of the plurality of sets of computing resources may include a second set of data storage devices, each of the second set of data storage devices having a first port directly connected to the first switch via a third resource connection of the plurality of resource connections and a second port directly connected to the second switch via a fourth resource connection of the plurality of resource connections.

The computing system may further include a fourth switch directly connected to the first switch via a third cross-connection and directly connected to the second switch via a fourth cross-connection.

The computing system may further include a third set of data storage devices, each of the third set of data storage devices having a first port directly connected to the third switch via a fifth resource connection and a second port directly connected to the fourth switch via a sixth resource connection.

The computing system may further include a fourth server node directly connected to the fourth switch via a fourth host link.

The computing system may further include a fourth set of data storage devices, each of the fourth set of data storage devices having a first port directly connected to the third switch via a seventh resource connection and a second port directly connected to the fourth switch via an eighth resource connection.

Each switch may be configured to: detect a failure of another switch; and provide access to the first set of data storage devices and the second set of data storage devices via the host link and the cross-connection corresponding to the switch.

The computing system may include N interfaces, where N is an integer, wherein a bandwidth unit B may be an amount of bandwidth required for one of the computing resources of the sets of computing resources to operate at full bandwidth, where B may be a positive number, wherein each resource connection may have a bandwidth of at least $1 \times B$, wherein each set of computing resources may have up to K computing resources, where K is an integer, wherein each host link of each of the plurality of interfaces may support a normal traffic bandwidth of $K \times B$ and a maximum traffic bandwidth greater than or equal to $K \times B$, and wherein each cross-connection of the plurality of cross-connections may have a bandwidth of at least $K \times B/(N-1)$.

The switches may be Peripheral Component Interconnect Express (PCIe) switches, and wherein the host links and the resource connections may be PCIe bus links.

According to one embodiment of the present invention, a computing system includes at least two high-availability pairs, each high availability pair including: a first switch; a second switch; a first interface coupled to the first switch via a first host link; a interface coupled to the second switch via a second host link; a first set of computing resources connected to the first switch via a first resource connection and connected to the second switch via a second resource connection; a second set of computing resources connected to the first switch via a third resource connection and connected to the second switch via a fourth resource connection; a plurality of first cross-connections, each of the first cross-connections directly connecting the first switch to each switch of each of the other high-availability pairs; and a plurality of second cross-connections, each of the second cross-connections directly connecting the second switch to each switch of each of the other high-availability pairs.

The first set of computing resources may include a first set of data storage devices, each of the first set of data storage devices having a first port directly connected to the first switch via a first resource connection and a second port directly connected to the second switch via a second resource connection, and wherein the second set of computing resources may include a second set of data storage devices, each of the second set of data storage devices having a first port directly connected to the first switch via a third resource connection and a second port directly connected to the second switch via a fourth resource connection.

The first switch may be configured to: detect a failure of the second switch; and provide access to the first set of data storage devices and the second set of data storage devices via the first host link and the first cross-connection.

The computing system may include N server nodes, where N is an integer, wherein a bandwidth unit B may be an amount of bandwidth required for one of the computing resources to operate at full bandwidth, where B may be a positive number, wherein each resource connection may have a bandwidth of at least 1×B; wherein each set of computing resources may have up to K computing resources, where K is an integer, wherein each server node may support a normal bandwidth of K×B and may support a maximum bandwidth greater than or equal to K×B, and wherein each cross-connection may have a bandwidth of at least K×B/(N−1).

The switches may be Peripheral Component Interconnect Express (PCIe) switches, and wherein the host links and the resource connections may be PCIe bus links.

The at least two high-availability pairs may include: a first high-availability pair; a second high-availability pair; a third high-availability pair; and a fourth high-availability pair.

According to one embodiment of the present invention, a redundant resource connection fabric includes: a first switch; a second switch; a third switch directly connected to the first switch via a first cross-connection and directly connected to the second switch via a second cross-connection; a first set of computing resources, each of the first set of computing resources having a first port directly connected to the first switch via a first resource connection and a second port directly connected to the second switch via a second resource connection; and a second set of computing resources, each of the second set of computing resources having a first port directly connected to the first switch via a third resource connection and a second port directly connected to the second switch via a fourth resource connection.

The first switch may be configured to: detect a failure of the second switch; and provide access to the first set of computing resources and the second set of computing resources via the first cross-connection.

The redundant resource connection fabric may further include a fourth switch directly connected to the first switch via a third cross-connection and directly connected to the second switch via a fourth cross-connection.

The redundant resource connection fabric may further include a third set of computing resources directly connected to the third switch via a first resource connection and directly connected to the fourth switch via a second resource connection.

The redundant resource connection fabric may further include a fourth set of computing resources directly connected to the third switch via a third resource connection and directly connected to the fourth switch via a fourth resource connection.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
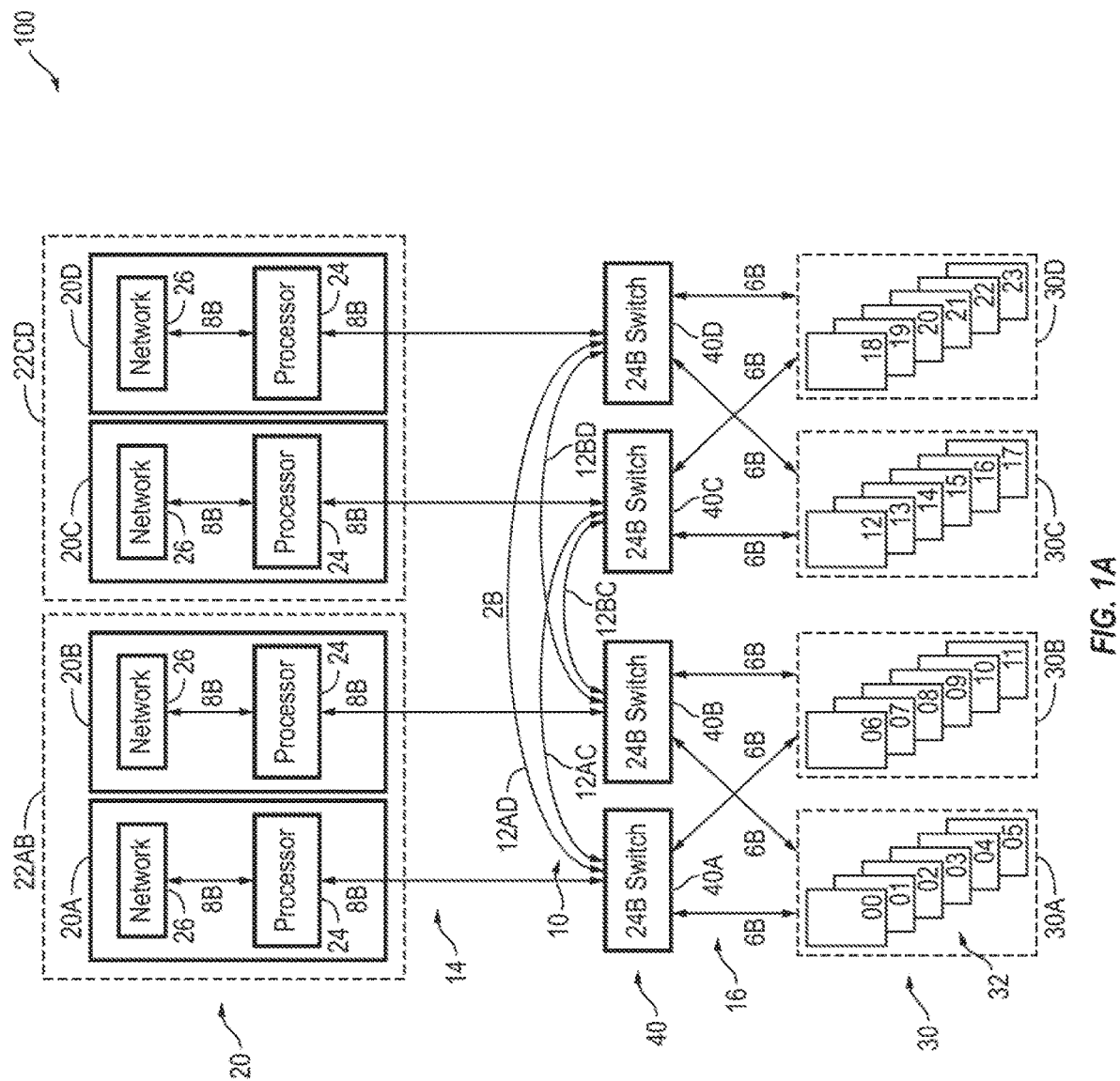
FIG. 1A is a block diagram illustrating a data storage system including an adaptive multipath fabric according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are generally directed to systems and methods for providing high availability access to computing resources through a set of interfaces, where an adaptive fabric interposed between the interfaces and the computing resources maintains access to the computing resources in the event of failure and, in some embodiments, maintains full performance access to those resources in the event of failure.

For example, a data storage computing system providing high-availability access to computing resources including: a plurality of interfaces; a plurality of sets of computing resources, each of the sets of computing resources including a plurality of computing resources; and at least three switches, each of the switches being connected to a corresponding one of the interfaces via a host link and being connected to a corresponding one of the sets of computing resources via a resource connection, each of the switches being configured such that data traffic is distributed to remaining ones of the switches through a plurality of cross-connections between the switches if one of the switches fails.

More concretely, a data storage system such as a storage area network (SAN) system may include data storage devices connected to one or more server nodes. The data storage devices may be, for example, solid state drives (SSDs) or hard disk drives (HDDs) that are connected to the server nodes over a bus such as peripheral component interconnect express (PCIe) bus. Each server node may include, for example, a central processing unit, memory, and network interface to provide remote access to the data stored on the data storage devices, where the data storage devices are mapped to the server nodes. However, a network storage system that uses only a single server node may not provide "high availability" (HA) because access to the data stored in the data storage devices will be lost if the single server node fails (e.g., if the network interface, the bus, or the CPU breaks down).

As such, some aspects of embodiments of the present invention are directed to an adaptive fabric that provides high availability access to the computing resources. In one embodiment, each of the computing resource is connected to multiple switches, and each of the switches is connected to at least one other switch via a cross-connection of the adaptive fabric. Each of the switches is connected to an interface (e.g., network interfaces) for communicating with users of the computing resources. In the event of a failure of an interface or the failure of a switch, the adaptive fabric reroutes data through the cross-connections to the other interfaces.

In one embodiment, the interfaces may be components of a host server node, where the server node is a computer system including a processor (CPU) and memory. The server nodes may provide the users with access to services associated with the computing resources by way of applications that are stored in the memory of the server node and that are run or executed by the processors of the server nodes. For example, the computing resources may be sets of data storage devices, in which case the applications may be network file servers, web servers, database servers, and the like. As another example, the computing resources may be dynamic memory for providing low latency caches. As still another example, the computing resources may be graphical processing units (GPUs), in which case the applications may be, for example, 3D rendering engines, machine learning training platforms (e.g., for training neural networks), cryptocurrency miners (e.g., bitcoin), and the like.

Some aspects of embodiments of the present invention relate to providing sufficient bandwidth to computing resources, such as data storage devices. When too many data storage devices are connected to the server nodes, there may not be enough bandwidth available between the server nodes and the data storage devices to allow the data storage devices to operate at full performance. More concretely, in a single server node system, if eight SSDs are connected to the PCIe switch, where each SSD is capable of saturating a 4 lane link (×4) connection to the PCIe switch, and if the server node has a 32 lane link (×32) to the PCIe switch, then the eight SSDs, alone, are sufficient to saturate the connection to the server node. If any additional data storage devices were added to the system there would not be sufficient bandwidth to operate all of the data storage devices at full performance because the connection between the server node and the PCIe switch is a bottleneck in the system. In some circumstances, the connection between the server node and the network adapter may similarly be a bottleneck in the system.

Some data storage devices have two connection ports to provide redundancy. For example, a data storage device having dual PCIe ports can have a first port connected to a first server node and a second port connected to a second server node. In this arrangement, if one of the server nodes fails the data storage device is still accessible through the other server node.

However, in such an arrangement, the failure of a server node exacerbates bandwidth limitations. Continuing the above example, while the two server nodes together may provide sufficient bandwidth for the connected data storage devices, if one of the server nodes fails, then all traffic to and from the data storage devices is handled by the surviving server node, which may not have sufficient bandwidth to handle the additional traffic. In particular, if the bandwidth requirements of the data storage devices already saturate both links to the server nodes, then failure of one of the server nodes results in approximately 50% performance degradation.

Therefore, some embodiments of the present invention are directed to systems and methods that provide access to data storage devices via a plurality of server nodes, where the systems and methods are able to maintain the full performance potential of the data storage devices (without performance degradation) in the event of a failure of a server node. In more detail, aspects of embodiment of the present invention relate to an adaptive multipath fabric of connections to connect computing resources (such as multi-port data storage devices) with server nodes via a plurality of switches, where the multipath fabric provides alternate paths for data traffic in the event of a failure in the system. Aspects of embodiments of the present invention can be applied to a variety of numbers of server nodes and sets of computing resources (e.g., data storage devices) in order to achieve particular desired system performance profiles. Aspects of embodiments of the present invention also allow scaling of both computing resources (e.g., data storage capacity) and general computation capacity (by adding more data storage devices or more server nodes, respectively) from an initial configuration to a full configuration while maintaining the specified performance profile in case of a node failure.

For the sake of convenience, embodiments of the present invention will be described below with respect to solid state drives having non-volatile memory express (NVMe) interfaces connected to host server nodes via PCIe switches and a PCIe fabric. However, embodiments of the present invention are not limited thereto and the underlying architecture of the fabric can be applied to other interfaces such as Ethernet, Infiniband® (IB), Fibre Channel (FC), small computer system interface (SCSI), serially attached SCSI (SAS), and the like. In addition, embodiments of the present invention can also be applied to providing high availability to other types of resources, such as hard disk drives, tape drives, volatile memory such as dynamic random access memory (DRAM), and computing units such as vector processors, graphical processing units (GPUs), digital signal processors (DSPs), and field programmable gate arrays (FPGAs).

Multipath Fabric Structure

Aspects of embodiments of the present invention will be described below in the particular case of a data storage system in which the computing resources are sets of dual-port data storage devices, the connections and switches are PCIe connections and switches, and the interfaces are network interfaces. However, embodiments of the present invention are not limited thereto and can be applied to other types of computing resources, interconnection protocols, and interfaces.

FIG. 1A is a block diagram illustrating a data storage system 100 including an adaptive multipath fabric according to one embodiment of the present invention. The embodiment of FIG. 1A includes a fabric 10 that interconnects server nodes 20 to sets of dual-port data storage devices 30. The fabric 10 may be implemented in a variety of ways, such as traces on a printed circuit board, and a plurality of electrical wires (e.g., cables such as ribbon cables, mini-SAS HD cables, OCuLink cables, etc.), and combinations thereof. The fabric 10 includes cross-connections 12 between switches 40. In addition to providing bandwidth balancing in the case of node failure, the cross-connections 12 can also be used in endpoint reassignment and bandwidth balancing to counter unbalanced node CPU usage and input/output (I/O) loads, as well as to provide peer-to-peer communication between the sets of data storage devices 30 (e.g., direct memory access transfers between the first set of data storage devices 30A and third set of data storage devices 30C, without significant involvement from a server node 20).

Each set of dual-port data storage devices includes one or more dual-port data storage devices 32, where each dual-port data storage device is connected to two different switches via resource links 16. As used herein, the term "switch" refers to an electrical component that provides a plurality of communication paths for devices connected to the switch to communicate, where the switch routes traffic between the devices and establishes connections between communicating devices connected to the switch.

As shown in FIG. 1A, each server node 20 includes one or more host processors 24 (e.g., Intel® Xeon® processors) connected to a network interface card (NIC) 26 (e.g., an Ethernet NIC) over a PCIe connection and also connected to a corresponding switch 40 over a host link 14 (e.g., another PCIe connection or plurality of PCIe connections). Each server node 20 is paired with another server node 20, which may be referred to as its high availability (HA) peer. For example, server nodes 20A and 20B are HA peers and form the pair 22AB. Together, pairs of mutual HA peers 22 provide two redundant paths through the fabric 10 to access one or more sets of data storage devices 30 (e.g., HA pair 22AB provide access to sets of data storage devices 30A and 30B). Other pairs of HA peer nodes 22 provide redundant paths to other sets of data storage devices 30 (e.g., HA pair 22CD provide access to sets of data storage devices 30C and 30D).

The fabric 10 also interconnects the multiple pairs of HA peers 22 to provide connectivity for balanced bandwidth across all nodes and the data storage devices 32 in the event of a single server node failure. In a system with N server nodes 20 (or N switches 40), the amount of additional cross-connect bandwidth from one switch 40 to each of the other N−2 switches 40 is 1/(N−1) of the bandwidth supported by each server node 20 in a normal, non-failure mode of operation (the "normal bandwidth"). As a result, the loss of bandwidth due to the failure of one node can be mitigated by the remaining N−1 nodes.

In more detail, FIG. 1A shows the case of four server nodes 20 (N=4). For the sake of convenience, FIG. 1A depicts bandwidth in units of B, where B is defined to be the bandwidth requirements of one of the data storage devices 32. In FIG. 1A, each set of data storage devices 30 includes six data storage devices 32. Therefore, each set of data storage devices 30 requires 6 B of bandwidth (1 B for each data storage device 32). As such, in the embodiment shown in FIG. 1A, the four server nodes 20 provide a total of 24 B of throughput (6 B per node) to the twenty-four data storage devices 32 in the system.

(Note that the actual bandwidth capacity of each connection between the server node 20 and its corresponding switch 40 is 8 B and therefore exceeds the 6 B bandwidth capacity required by each set of data storage devices 30 by 2 B. In addition, in the embodiment of FIG. 1A, the connection between the host processor 24 and the network interface 26 has a bandwidth at least equal to the bandwidth between the host processor 24 and the switch 40, e.g., 8 B)

As such, in the embodiment shown in FIG. 1A, the cross-connect bandwidth from each node to each of the non-HA peer nodes is 6B/3=2 B. For example, the cross-connect bandwidths of each cross-connection 12AC and 12AD between the first switch 40A corresponding to the first server node 42A and the switches 40C and 40D of its non-HA peer nodes 20C and 20D are 2 B. Likewise, the cross-connect bandwidths of each cross-connection 12BC and 12BD between the second switch 40B corresponding to the second node 20B and the switches 40C and 40D of its non-HA peer nodes 20C and 20D are also 2 B. As shown in FIG. 1A, the cross-connections 12 are made between the switches 40. However, embodiments of the present invention are not limited thereto and, as discussed above, the minimum bandwidth of each of the cross-connections 12 can be set at the bandwidth supported by each server node 20 in a normal, non-failure mode of operation divided by number of servers N minus 1. In still other embodiments, wherein the system is designed to tolerate the failure of multiple server nodes 20, then the minimum bandwidth of each of the cross-connections 12 can be set at the bandwidth supported by each server node 20 in a normal, non-failure mode of operation divided by number of servers N minus the number of failures to be tolerated.

Figure 1B:
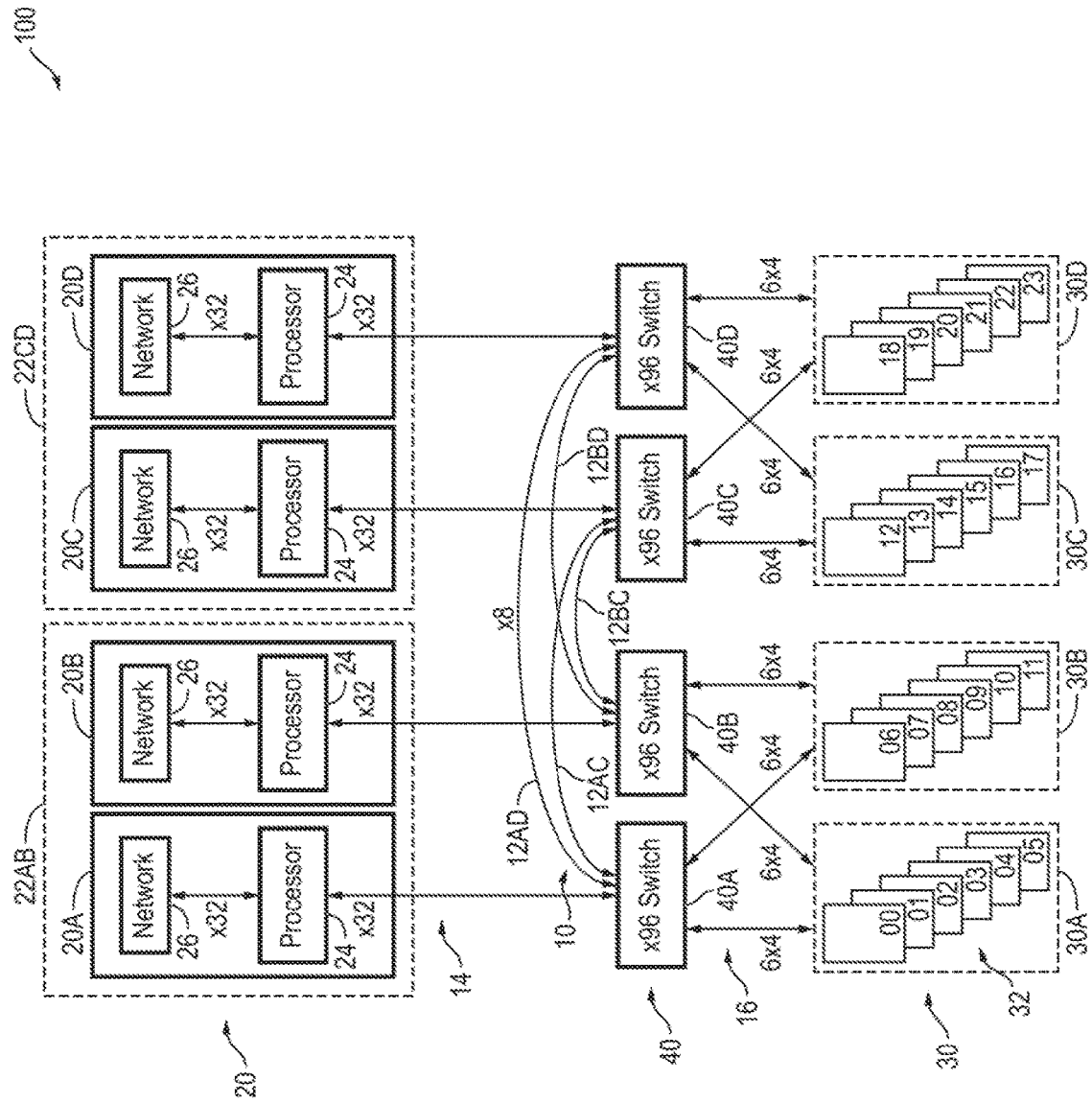
FIG. 1B is a block diagram illustrating a data storage system including an adaptive multipath fabric according to one embodiment of the present invention.

FIG. 1B is a block diagram illustrating a data storage system 100 including an adaptive multipath fabric according to one embodiment of the present invention in which B=×4 (e.g., the bandwidth of a 4 lane PCIe link). In the case of PCIe 3.0, a ×4 link provides a maximum bandwidth or throughput of about 4 GB/s. Like components are labeled with like reference numerals in FIG. 1A, and therefore descriptions of these components are not repeated herein.

In the example shown in FIG. 1B, four server nodes 20, with 64 PCIe 3.0 lanes per node, are connected to twenty four dual-port NVMe SSDs arranged into four sets of six drives each. Each of the twenty four dual-port NVMe SSDs has two endpoints (two "SSD endpoints"), where each endpoint can be assigned to any one of the server nodes. For example, each of the end points of the SSDs in the first set of data storage devices 30A may be assigned to the first server node 20A. Using PCIe 3.0, the system shown in FIG. 1B can deliver an end-to-end system performance profile of 96 GB/s user data throughput (96 lanes of PCIe 3.0 bandwidth) and high availability (full performance access to all of the SSDs is maintained in the event of a single serve node failure).

In the example embodiment of FIG. 1B, when operating at full load, each of the NVMe SSDs 32 transfers data at about 4 GB/s and therefore can be served by a single ×4 link. In addition, each of the two ports in the dual-port NVMe SSDs provides a ×4 link. As a result, failure of either of the two ports of an NVMe SSD still allows the data storage device to operate at full performance. Because each of the NVMe SSDs requires four PCIe lanes of bandwidth, each set of six dual-port NVMe SSDs requires 6×4=×24 or 24 lanes of bandwidth to maintain full performance of the entire set of data storage devices 30.

As shown in FIG. 1B, the sets of data storage devices 30 are connected to PCIe switches 40. Each switch 40 is also connected to a corresponding host server node 20 over a PCIe connection. In the embodiment shown in FIG. 1B, there is a ×32 link between the PCIe switch and the host processor 24 of the server node 20.

In the configuration shown in FIG. 1B, server nodes 20A and 20B are HA-peer nodes, providing dual-port access to twelve SSDs 00-11 (the two sets of SSDs 30A and 30B). Similarly, server nodes 20C and 20D are HA-peer nodes, providing dual-port access to another twelve SSDs 12-23 (the two sets of SSDs 30C and 30D).

The PCIe fabric 10 shown in FIG. 1B also includes host links 14 which interconnect a total of one hundred twenty eight PCIe 3.0 lanes from the four server nodes 20 (32 lanes from each node) to the switches 40 in addition to resource connections 16 between the switches 40 and the resources (the data storage devices 32). Each of the host links 14 may include a plurality of connections. For example, in the case of a dual-processor server node, the 32 lanes from each server node may include 16 lanes connected to a first CPU socket of the server node and 16 lanes connected to a second CPU socket of the server node. In addition, each of the server nodes 20 may include multiple host links 14 to connect the server node to multiple switches 40. As shown in the embodiment of FIG. 1B, the resource connections 16 include a total of one hundred ninety two lanes across twenty four dual-port NVMe SSDs where each SSD has a throughput capability of ×4 lanes of bandwidth (~4 GB/s). As such, each SSD has twice as much port connectivity (2×4 lanes per SSD) versus its throughput capability (×4 lanes per SSD). In order to achieve the full throughput of ×4 lanes per SSD for total ninety six lanes across the twenty four drives, each server node 20 provides ×24 lanes of bandwidth out of its ×32 lanes of throughput capability.

In some circumstances, each port of the dual-port NVMe SSDs has a bandwidth lower than the full throughput capability of SSD. For example, some dual-port NVMe SSDs have only two ×2 ports, meaning that each port supports only ×2 lanes. As a result, assuming that the maximum throughput of the SSD is ×4 lanes, if one of the ports fails or the switch connected to one of the ports fails, then the SSD only has ×2 lanes worth of connectivity (i.e., half of its throughput capability).

In order to support sustainable bandwidth of 96 GB/s in the event of a single server node failure, the cross-connections 12 of the fabric 10 provide 24 GB/s/(N−1)=8 GB/s of cross-connect bandwidth between each of nodes 20A and 20C, nodes 20A and 20D, nodes 20B and 20C, and nodes 20B and 20D.

The minimum number of lanes provided by the PCIe switch 40 depends on the requirements of the connected components, namely, the two sets of data storage devices 30 (e.g., the first PCIe switch 40A is connected to a first set of data storage devices 30A and a second set of data storage devices 30B), the host processor 24, and the cross-connections 12 of the fabric 10. In the example shown in FIG. 1B, each of the sets of data storage devices 30 requires 24 lanes, the host processor 24 requires 32 lanes, and each of the two cross-connections 12 to the fabric 10 requires 8 lanes, for a total of 24+24+32+8+8=96 lanes. As such, in the embodiment shown in FIG. 1B, each PCIe switch 40 is a ×96 switch or a 96 lane switch. However, embodiments of the present invention are not limited thereto and the switch may have more lanes than the number required to meet the needs of the connected components (in this particular example, the PCIe switch may have more than 96 lanes).

Rebalancing Bandwidth Under Node Failure

Figure 2A:
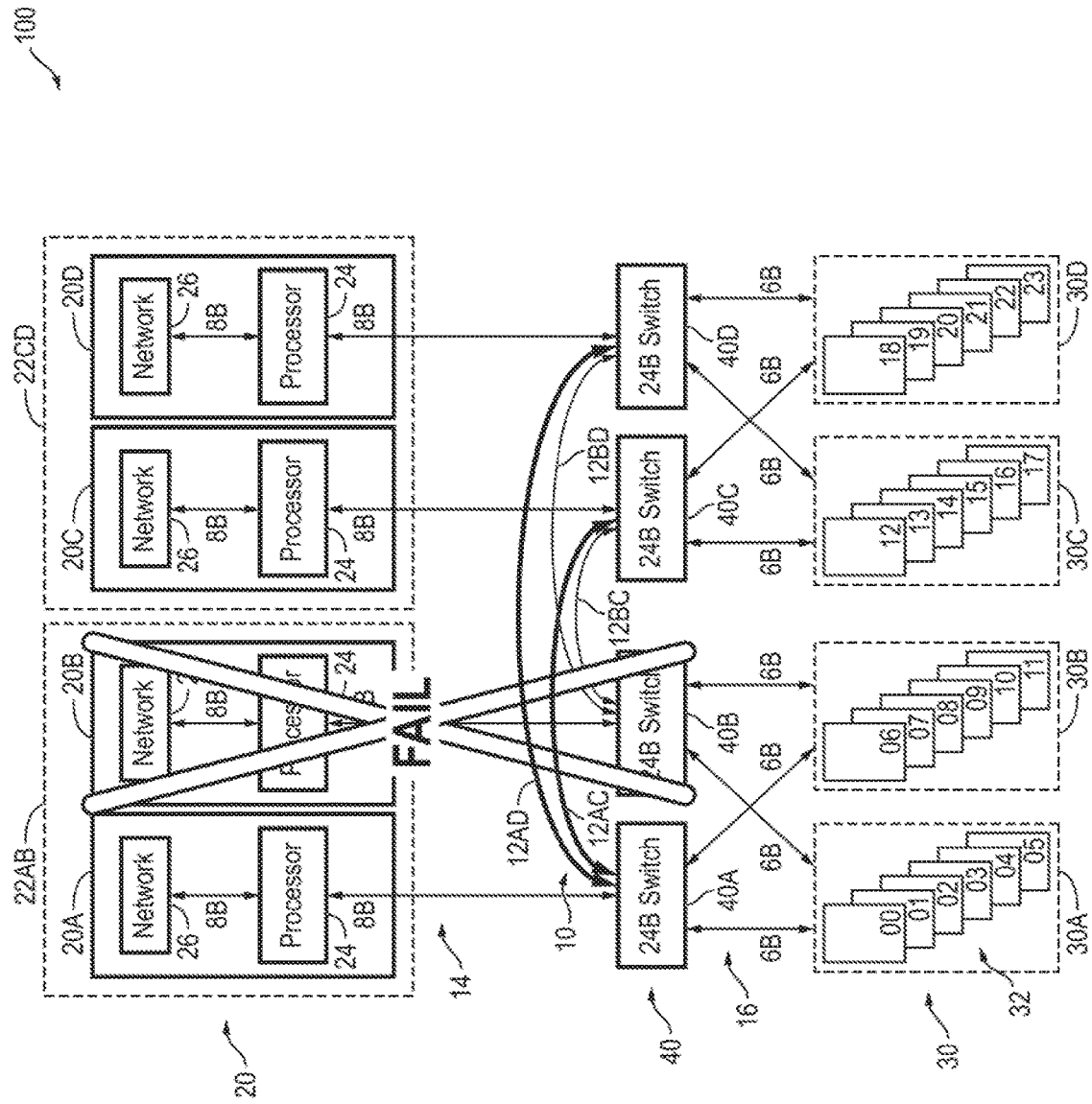
FIG. 2A is a block diagram illustrating the failure of a switch and the rebalancing of data transfers according to one embodiment of the present invention.

FIG. 2A is a block diagram illustrating the failure of a switch and the rebalancing of data transfer traffic according to one embodiment of the present invention. In the event of the failure of a switch 40, the server node 20 associated with the switch 40 will also be disconnected from the rest of the system because there are no redundant connections between the server nodes and the switches. Therefore, in some embodiments of the present invention, the failure of a switch 40 also substantially results in the loss of its associated server node. However, embodiments of the present invention are not limited thereto and, in some embodiments, a server node may be connected to multiple switches.

In the example of FIG. 2A, the server node 20B connected to the failed switch 40B becomes disconnected from the data storage system 100 and therefore the workload or data traffic handled by that switch 40B and that server node 20B is distributed among the remaining N−1 switches 40A, 40C, and 40D and N−1 server nodes 20A, 20C, and 20D. Data transfers to and from the sets of data storage devices 30 coupled to the failed switch or node 20B pass through the redundantly connected switch 40A. This rebalancing of workload maintains throughput to all twenty four SSDs in the system (a ×4 link per SSD).

The performance of data transfers to and from the sets of drives connected to the failed switch is maintained because of the excess capacity built into the system. In particular, part of the bandwidth comes from the server node that is directly connected to the surviving member of the HA pair, and the remaining part of bandwidth is provided by the other server nodes (e.g., 20A, 20C, and 20D) connected through the fabric 10. In addition, the remaining N−1 server nodes (e.g., 20A, 20C, and 20D) have sufficient bandwidth in their connections with their respective switches (e.g., 40A, 40C, and 40D) to accommodate the additional load.

In some embodiments of the present invention, the switches 40 in the adaptive multipath fabric 10 are programmed to automatically detect such a node failure, and, in turn automatically reassign SSD endpoints to server nodes 20 and to rebalance bandwidth across surviving server nodes. In other words, the switches 40 may maintain information about how to reach each SSD based on the current configuration of the switches, monitor the connections between the server nodes 20, the sets of data storage devices 30, and the other switches 40 at the physical and link layers for error conditions and report those errors to a management system (e.g., one of the server nodes 20 or another dedicated management processor). The management system can determine whether a link or a server node has failed based on the reported errors and can reconfigure the switches 40 to reassign the SSD endpoints of the SSDs to reachable ones of the server nodes 20. Although there is no degradation in bandwidth with the single node failure shown in FIG. 2A, the cross connections 12 between nodes traverse one extra level of PCIe switches, and therefore experience additional latency. However, the latency through a PCIe switch is generally small and insignificant compared to the overall latency of data access to/from the SSDs.

Figure 2B:
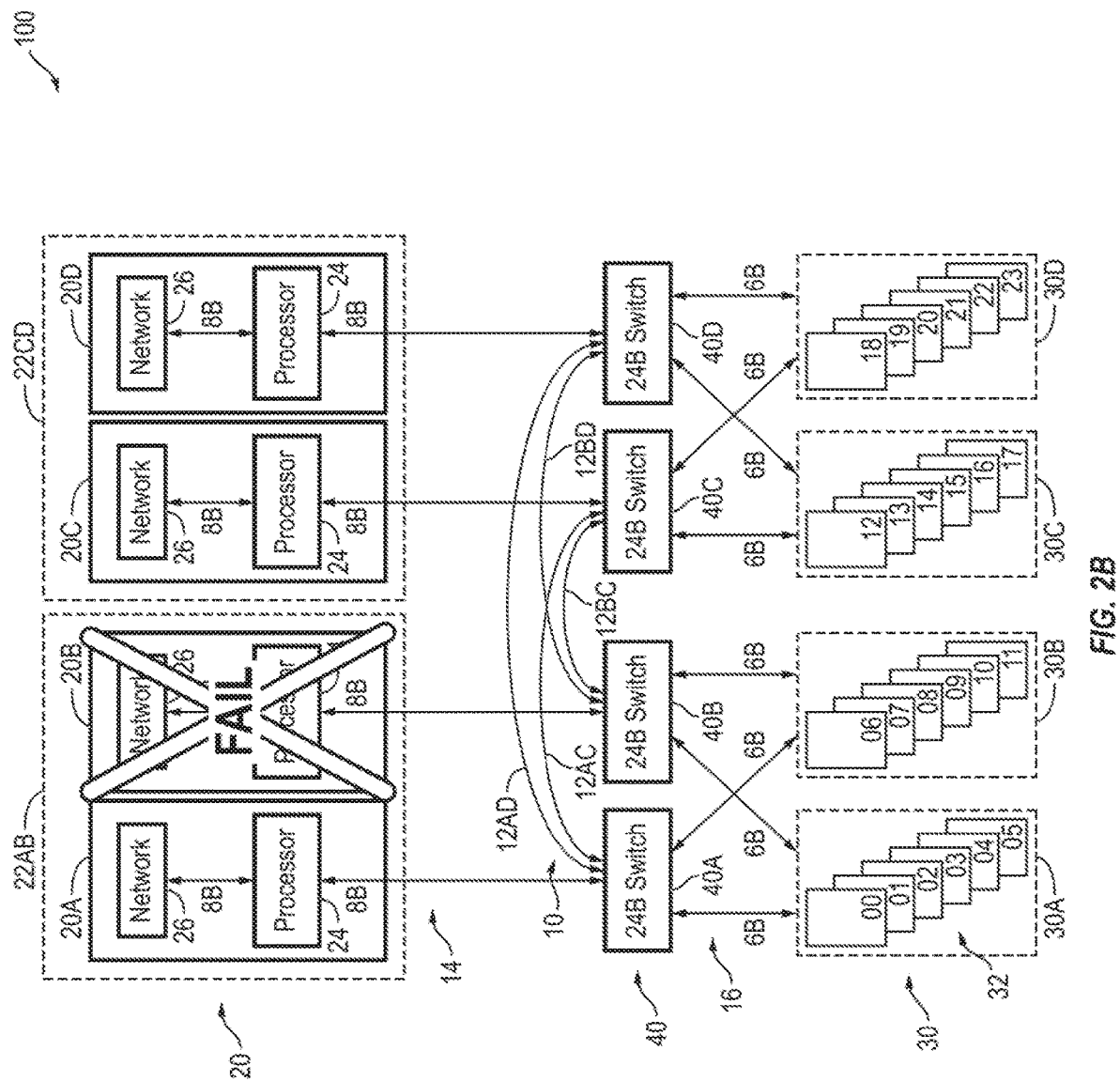
FIG. 2B is a block diagram illustrating the failure of a server node and the rebalancing of data transfers according to one embodiment of the present invention.

FIG. 2B is a block diagram illustrating the failure of a server node and the rebalancing of data transfers according to one embodiment of the present invention. Referring to FIG. 2B, in the event that a server node 20B fails, but its corresponding switch 40B survives, data can still be routed through the functioning switch 40B, but is only accessible through the three surviving server nodes 20A, 20C, and 20D. In this event, the management system (e.g., one of the server nodes 20 or another dedicated management processor) in the adaptive multipath fabric can be programmed to automatically detect the failure of the server node 20B and, as in the embodiment of FIG.

2A, automatically reassign SSD endpoints to the surviving endpoints. In other embodiments of the present invention, the detection of errors and the automatic reconfiguration of the switches 40 is implemented in the switches themselves (e.g., by processing units integrated into the switches 40).

In some embodiments of the present invention, an individual switch may not provide sufficient bandwidth to allow two sets of data storage devices 30 to operate at full performance. For example, if switch 40B fails, then the only routes to sets of data storage devices 30A and 30B are through surviving switch 40A. If the surviving switch 40A has fewer than ×96 lanes, then sets of data storage devices 30A and 30B will not have enough bandwidth to operate at full speed. However, if the switch 40B does not fail and only the associated server node 20B fails, then the switch 40B can participate in rerouting the data to the surviving server nodes 20A, 20C, and 20D. In some such embodiments, there is sufficient bandwidth to continue to operate all of the sets of data storage devices 30 at full performance.

Inter-Node Communication

Figure 3:
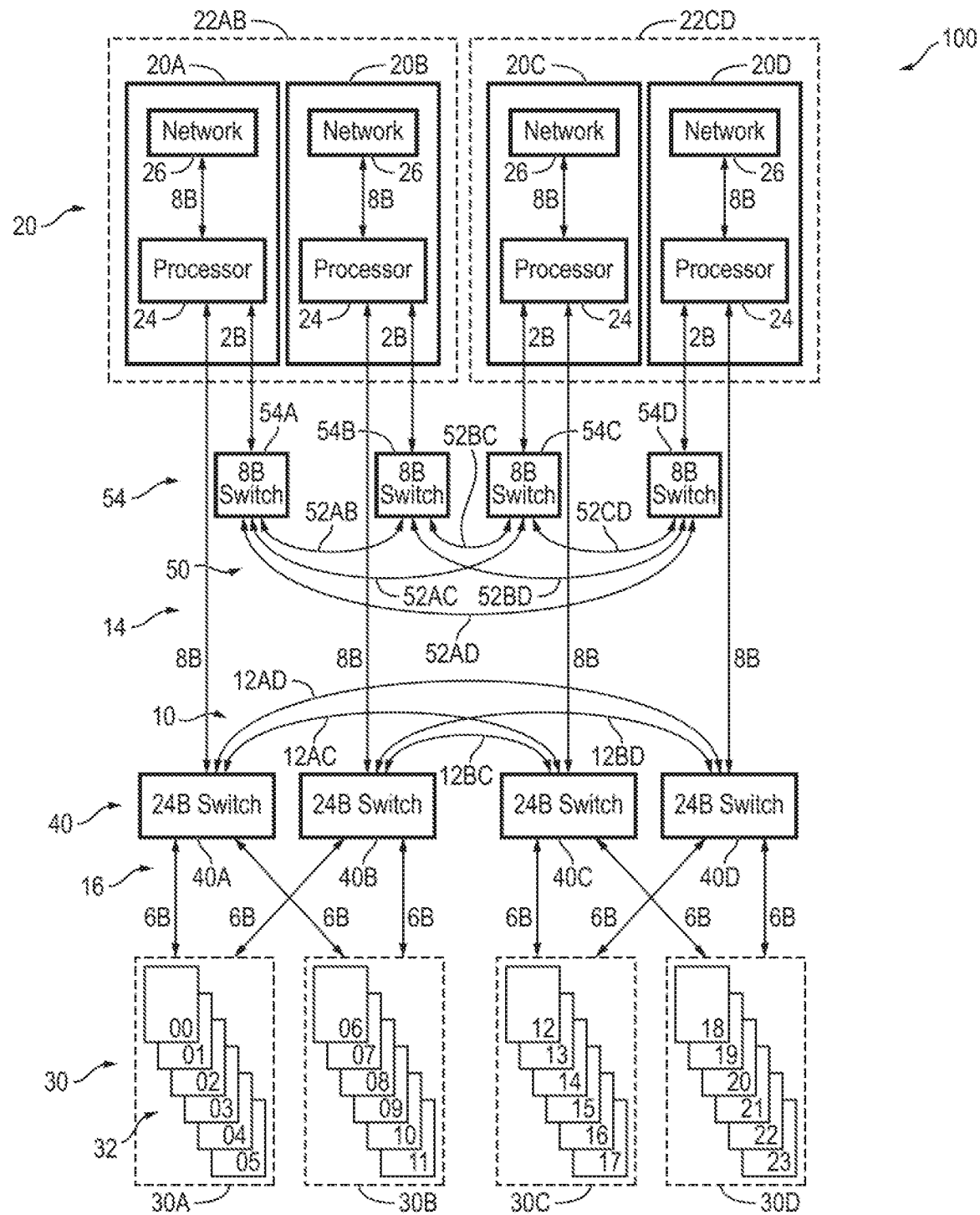
FIG. 3 is a block diagram of a system which further includes a secondary fabric connecting the server nodes according to one embodiment of the present invention.

In some embodiments of the present invention, a secondary fabric 50 can be included for communication between the server nodes 20. FIG. 3 is a block diagram of a system which further includes a secondary fabric 50 connecting the server nodes 20 according to one embodiment of the present invention. The secondary fabric includes inter-connections 52 (e.g., 52AB, 52AC, 52AD, 52BC, and 52BD) that connect secondary switches 54 (e.g. 54A, 54B, 54C, and 54D) to one another, where each secondary switch 54 is directly connected to one corresponding server node 20 (e.g., secondary switch 54A is directly connected to server node 20A). Like fabric 10, the secondary fabric 50 may be implemented in a variety of ways, such as traces on a printed circuit board, a plurality of electrical wires (e.g., cables such as ribbon cables, mini-SAS HD cables, OCuLink cables, etc.), and combinations thereof. According to one embodiment of the present invention, the secondary fabric 50 is connected to the server node CPU non-transparent bridge (NTB) ports. The secondary fabric 50 provides a low-latency internal communication between the server nodes 20 which can be used, for example, to synchronize metadata between the server nodes 20.

Incrementally Expanding the Fabric

While FIGS. 1A, 1B, 2, and 3 illustrate systems of two pairs 22 of server nodes 20 providing high availability and high performance access to four sets of data storage devices, embodiments of the present invention are not limited thereto.

Embodiments of the present invention include configurations of data storage devices, switches, and server nodes in accordance with the workload requirements of a particular application.

Figure 4A:
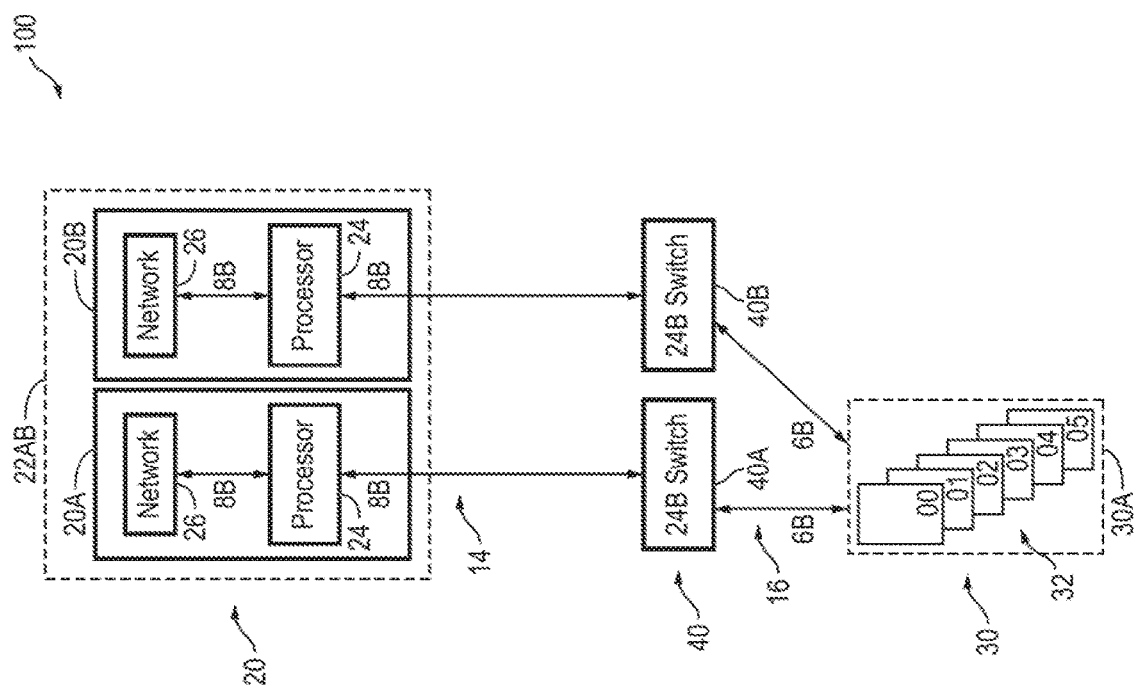
FIG. 4A is a block diagram illustrating a small high availability configuration including two server nodes and one set of data storage devices according to one embodiment of the present invention.

FIG. 4A is a block diagram illustrating a small high availability configuration including two server nodes 20A and 20B and one set of data storage devices 30A according to one embodiment of the present invention. The configuration of FIG. 4A may be useful in circumstances where data storage capacity of a single set of data storage devices is sufficient for the current workload, and where high availability through redundant server nodes is desirable.

Referring to FIG. 4A, the single set of data storage devices 30A is connected to both the first switch 40A and the second switch 40B. Like in the embodiment of FIG. 1A, the first switch 40A is connected to a first server node 20A, and the second switch 40B is connected to a second server node 20B. In the event of failure of either the first server node 20A or the second server node 20B, the set of data storage devices 30A remains accessible via the surviving node.

When data storage demands increase, additional sets of data storage devices can be added to the system shown in FIG. 4A. For example, when one additional set of data storage devices can be added by connecting the added data storage devices to both the first switch 40A and the second switch 40B to arrive at a configuration substantially similar to the first server node 20A, the second server node 20B, the first switch 40A, the second switch 40B, the first set of data storage devices 30A and the second set of data storage devices 30B, but without the inter-connections to other switches. As before, if either of the server nodes 20A and 20B or either of the switches 40A and 40B fails, both the first and second sets of data storage devices 30A and 30B remain accessible.

Figure 4B:
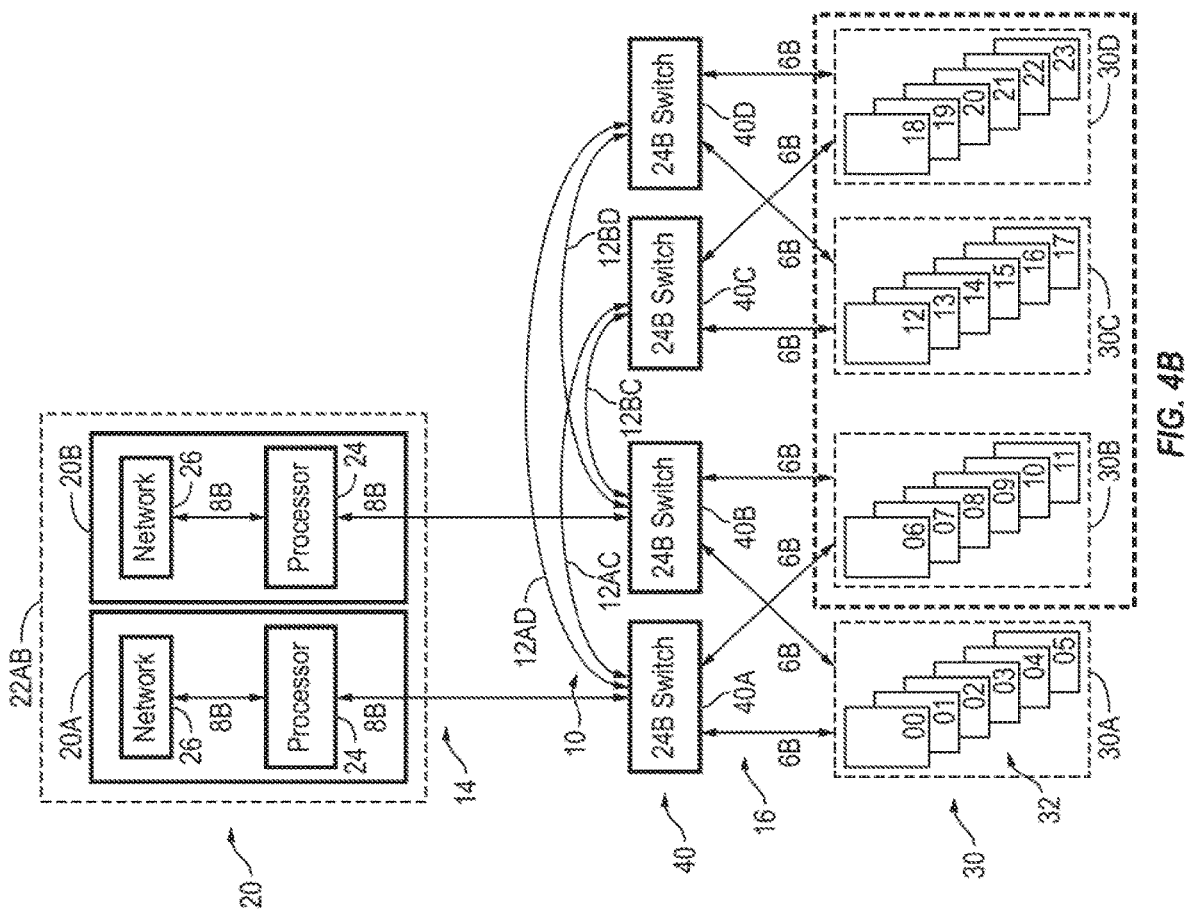
FIG. 4B illustrates the expansion of the configuration shown in FIG. 4A to include additional sets of data storage devices according to one embodiment of the present invention.

FIG. 4B illustrates the expansion of the configuration shown in FIG. 4A to include additional sets of data storage devices according to one embodiment of the present invention. As shown in FIG. 4B, the second set of data storage devices are coupled to the first switch and the second switch. The configuration of FIG. 4B further includes additional interconnects in the form of a third switch 40C and a fourth switch 40D in place of additional server nodes. The third set of data storage devices 30C is coupled to the third and fourth switches 40C and 40D, and the fourth set of data storage devices 30D is also coupled to the third and fourth switches 40C and 40D. Cross-connections 12AC and 12BC connect the third switch 40C to the first and second switches 40A and 40B and cross-connections 12AD and 12BD connect the fourth switch 40D to the first and second switches 40A and 40B. As a result, the first and second server nodes 20A and 20B can access the third and fourth sets of data storage devices 30C and 30D via the third and fourth switches 40C and 40D.

In the configuration shown in FIG. 4B, all of the data storage devices remain accessible in the failure of either one of the server nodes 20A and 20B or in the event of failure of any of the four switches 40A, 40B, 40C, and 40D. However, the data throughput performance of the third and fourth sets of data storage devices 30C and 30D is limited by the bandwidth of the cross-connections 12, and also limited by the host link 14 between the server nodes 20 and their corresponding switches 40. In particular, in the arrangement of FIG. 4B, the two server nodes 20 provide a total of 16 B of bandwidth (8 B from each server node 20) across all four sets of data storage devices 30, which means 4 B per set of data storage devices, which corresponds to the maximum bandwidth available to the sets of data storage devices 30C and 30D that are connected only via the cross-connections 12AC, 12AD, 12BC, and 12BD (in other words, 2 B per cross-connection and four cross connections gives a total of 8 B shared across the two sets of drives, for 4 B for each set of drives). In addition, the failure of any of the server nodes or any of the switches will also further impact the data throughput of the system. As such, the configuration shown in FIG. 4B is better suited, for example, to circumstances where having sufficient bandwidth is less important than total storage capacity.

If additional bandwidth is required, the configuration of FIG. 4B can be further expanded to connect server nodes to the third and fourth switches 40C and 40D, which results in substantially the same configuration as seen in FIG. 1B. As such, embodiments of the present invention allow for incremental expansion of the system as needed to serve the growing needs of its users.

Figure 4C:
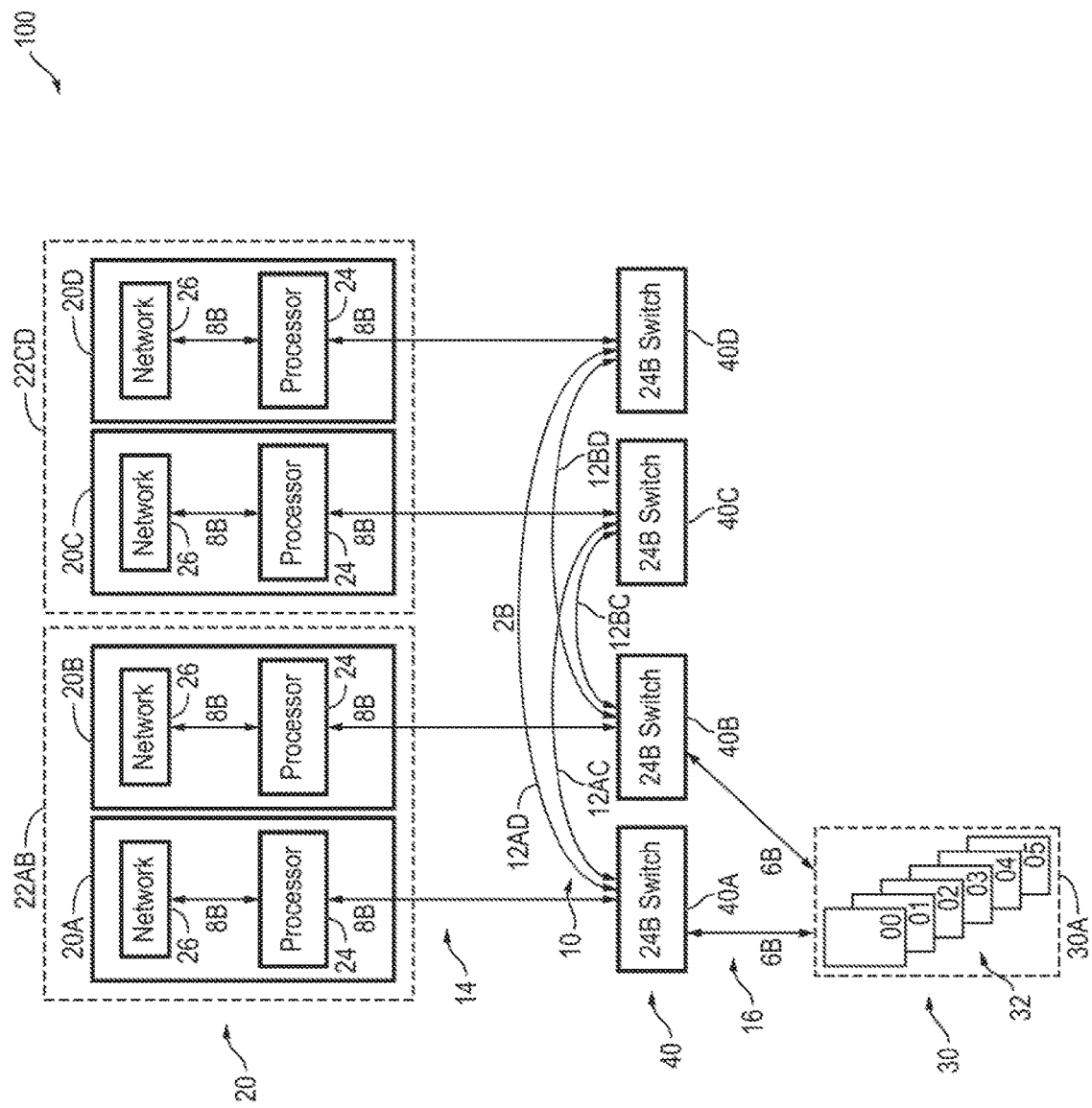
FIG. 4C illustrates the expansion of the configuration shown in FIG. 4A to include additional server nodes according to one embodiment of the present invention.

In still other embodiments of the present invention, the workloads demanded by users may be more compute-intensive than data-intensive. FIG. 4C illustrates the expansion of the configuration shown in FIG. 4A to include additional server nodes according to one embodiment of the present invention.

Starting with the base configuration of two server nodes and one set of six data storage devices 30A as shown in FIG. 4A, a third server node 20C can be added together with a third switch 40C, which is connected to the first and second switches 40A and 40B via cross-connections 12AC and 12BC. Alternatively, the third server node 20C can be connected to the first and second switches 40A and 40B through a passive interconnect board instead of an additional switch (e.g., effectively direct connections between the server node 20C and the switches 40A and 40B). This can increase the computational capacity of the system while retaining access to the same set of data storage devices. If computational demands further increase, a fourth node 20D can be connected to the first and second switches 40A and 40B, either through a fourth switch 40D or via a passive interconnect board.

The use case here could be if the software stack running on the two server nodes 20A and 20B is a bottleneck impacting the ability to achieve full bandwidth to the data storage devices 32, in which case adding more server nodes provides more server compute power. If additional storage is required, then additional sets of data storage devices can also be incrementally added, in a manner similar to that shown above with respect to FIG. 4B, to reach, for example, the configuration of four server nodes and plus twenty four data storage devices, as shown in FIG. 1B.

For the sake of convenience, aspects of embodiments of the present invention were described above in the context of configurations having up to four switches. However embodiments of the present invention are not limited thereto. For example, some embodiments of the present invention can include more than four switches.

Figure 5:
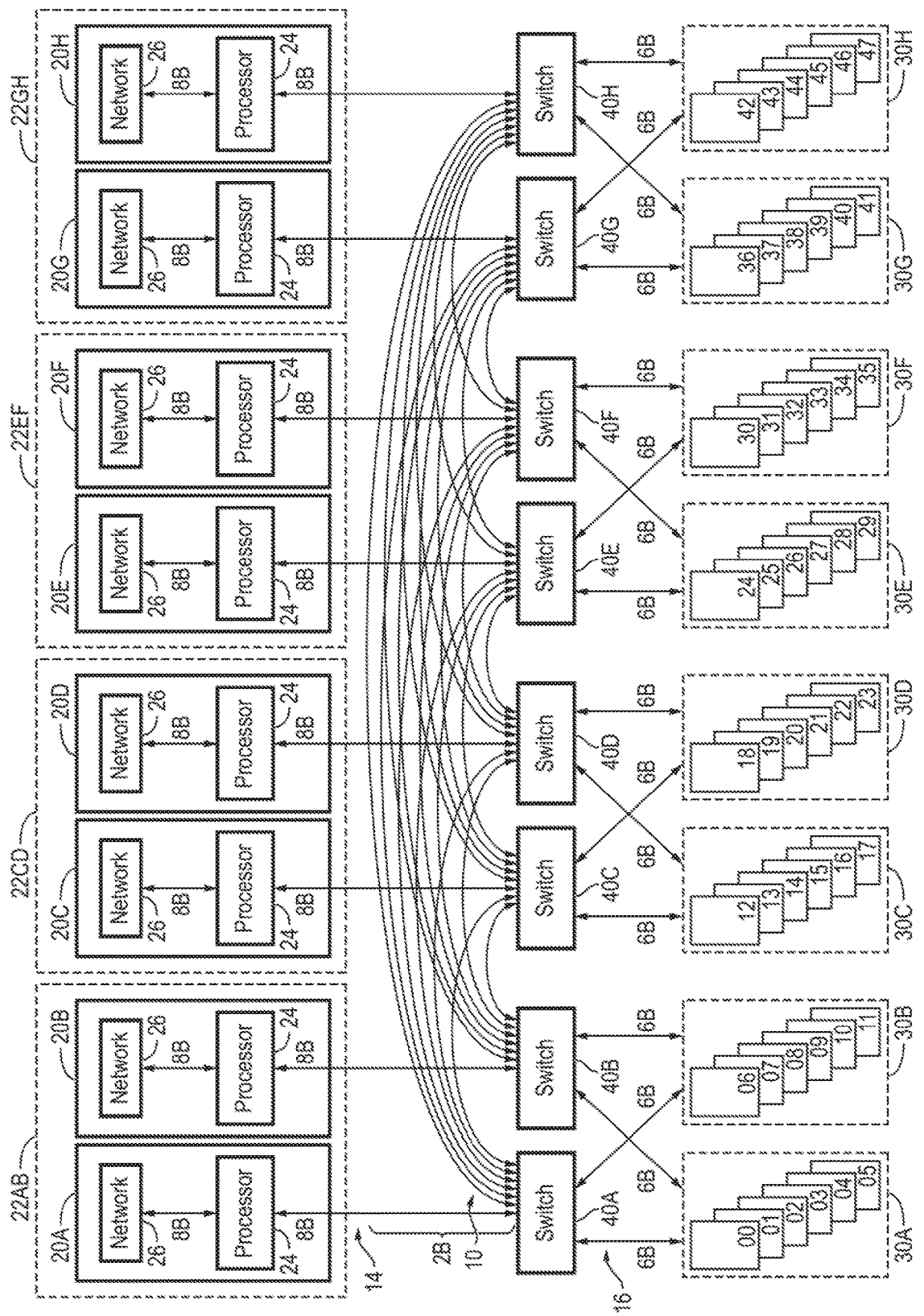
FIG. 5 is a block diagram illustrating a system having eight server nodes connected to forty eight data storage devices via eight switches for a total throughput of 192 GB/s (based on the above assumptions regarding each data storage device having about 4 GB/s throughput) according to one embodiment of the present invention.

Using a similar approach, variants of data storage systems 10 including adaptive multipath fabrics according to embodiments of the present invention may include, for example, six server nodes connected to thirty six data storage devices via six switches for a total throughput of 144 GB/s. As another example, FIG. 5 is a block diagram illustrating a system having eight server nodes (20A, 20B, 20C, 20D, 20E, 20F, 20G, and 20H) connected to forty eight data storage devices via eight switches (40A, 40B, 40C, 40D, 40E, 40F, 40G, and 40H) for a total throughput of 192 GB/s (based on the above assumptions regarding each data storage device having about 4 GB/s throughput) according to one embodiment of the present invention.

As such, the adaptive multipath fabric architecture according to embodiments of the present invention can deliver a balanced and configurable end-to-end system performance profile using a group of server nodes and a group of high-performance multi-port NVMe SSDs. The performance is balanced across server nodes and end points, and performance can be sustained and balanced under single node failures.

The data storage system may provide, for example, a storage area network (SAN) over an Ethernet connection and the multipath fabric can deliver network storage performance over Ethernet matching the performance between the underlying drives to the server nodes.

For example, a system performance profile can be a combination of one or more of: 100 GB/s user data throughput; low latency internal communication between server nodes; high availability access to the data on the end points.

Embodiments of the present invention can provide an adaptive multipath fabric architecture that: interconnects a group of server nodes (PCIe root-complexes) with a group of multi-port SSDs (PCIe endpoints); offers flexibility in terms of number of server nodes, number of SSDs, and end-to-end performance specification; supports end-to-end load balancing across server nodes and SSDs; provides redundant access from a pair of server nodes (HA-peers) to a set of SSDs via the multi-ports of the SSDs; provides cross connect bandwidth between multiple pairs of HA-peer nodes to allow for rebalancing of bandwidth across all server nodes in failure-recovery and load-balancing scenarios; can sustain a single node failure without any degradation of end-to-end system performance by rebalancing bandwidth across all surviving nodes; and has capability for automatic failure detection, which in turn triggers reassignment of SSD endpoints to server nodes and rebalancing of bandwidth.

Aspects of embodiments of the present invention also enable: the capability to interconnect a group of PCIe root-complexes (such as server nodes) with a group of multi-port PCIe endpoints (such as dual-port NVMe SSDs) in a flexible and expandable manner; the capability to continue to access all PCIe endpoints in the event of a single root-complex failure (HA) while limiting performance degradation; the capability to balance the allocation of bandwidth between root-complexes and endpoints; the capability to dynamically reassign PCIe endpoints to root-complexes in failure-recovery or load-balancing scenarios; the capability to enable peer-to-peer data transfers between endpoints without any overhead on the host root-complexes; and the capability to enable low-latency high-throughput communication between HA peer server nodes While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, although embodiments of the present invention are described above with respect to the computing resources as solid state drives having dual PCIe ports connecting to server nodes via PCIe switches, embodiments of the present invention are not limited thereto. For example, in some embodiments of the present invention, the solid state drives may have more than two ports, but instead can also encompass the use of SSDs having various numbers of endpoint ports, e.g., greater than or equal to two. In addition, in some embodiments of the present invention, the server nodes may be connected to the fabric through multiple ports. For example, each server node may be connected to more than one switch through multiple host links, thereby providing redundant connections between the server nodes and the computing resources in the event that a host link or a switch fails. Depending on the bandwidth of the host links and the switches, these redundant connections may also allow the server nodes to operate at full bandwidth, even under failure conditions.

According to some embodiments, the solid state drives may use a different interface such as Ethernet, Infiniband® (IB), Fibre Channel (FC), serially attached SCSI (SAS), and the like. For example, in the case of an Ethernet interface, the PCIe switch may be replaced with a network (Ethernet) switch.

According to some embodiments, the resources connected using the adaptive multipath fabric are other types of computing resources such as hard disk drives, tape drives, volatile memory such as dynamic random access memory (DRAM), and computing units such as vector processors, graphical processing units (GPUs), digital signal processors (DSPs), and field programmable gate arrays (FPGAs).

In still other embodiments of the present invention, each individual computing resource need not have multiple ports. For example, each set of computing resources may include an adapter or switch that provides links to each of the individual computing resources and links to the two connected switches 40. As a more specific example, each of the data storage devices 32 may be a single port data storage device, where each data storage device 32 is connected to an adapter associated with the set of data storage devices 30. The adapter, in turn, may also be connected to two switches 40. In this way, the set of data storage devices 30 is still connected to multiple switches 40, even though each of the individual data storage devices is a single-port device. This technique may also be applied to other types of computing resources, as described above.

While, for the sake of convenience, the relative bandwidths of the interfaces were the same in the illustrated embodiments (e.g., 6 B for each set of data storage devices, 8 B for the connection between each server node and a corresponding switch, and 2 B for each cross connection between switches), embodiments of the present invention are not limited thereto, and embodiments of the present invention also include embodiments having interfaces that provide different amounts of bandwidth (e.g., a bandwidth that corresponds to the throughput of the computing resources associated with the interface). In some embodiments of the present invention designed to maintain full performance to the resources connected to the adaptive multipath fabric in the event of the failure of a single server node, the total bandwidth of the cross-connections (or the "cross-connect bandwidth") is sufficient to at least equal the bandwidth that would normally be supplied by that single node. Although some of the embodiments of the present invention are illustrated herein depict all of the cross-connections as having the same bandwidth and as being connected to every switch outside of the HA pair, embodiments of the present invention are not limited thereto. For example, in some embodiments, the cross-connections have different bandwidths, and in some embodiments, the cross-connections are made to less than all of the other switches.

While, for the sake of convenience, embodiments having up to eight hosts were illustrated, embodiments of the present invention are not limited thereto and similar concepts can be implemented with varying numbers of hosts.

Similarly, embodiments of the present invention are not limited to sets of exactly six data storage devices, but also include embodiments having various numbers of SSDs in each set (e.g., the same number in each set or various numbers in each set).

Some aspects of embodiments of the present invention use the fabric failure detection and reconfiguration capabilities to communicate with storage management tools to improve storage infrastructure management.

What is claimed is:

1. A computing system providing high-availability access to computing resources comprising:
a plurality of interfaces comprising a first interface and a second interface;
a first switch:
connected to the first interface via a first host link comprising a first end contacting the first switch and a second end contacting the first interface, and
connected to at least one switch of a third switch or a fourth switch via a first cross-connection of a fabric comprising a first end contacting the first switch and a second end contacting the third switch or the fourth switch;
a second switch:
connected to the second interface via a second host link comprising a first end contacting the second switch and a second end contacting the second interface; and
connected to at least one of the third switch or the fourth switch via a second cross-connection of the fabric comprising a first end contacting the second switch and a second end contacting the third switch or the fourth switch;
a first set of computing resources comprising a first computing unit connected to:
the first switch via a first resource connection of the fabric comprising a first end contacting the first switch and a second end contacting the first computing unit; and
the second switch via a second resource connection of the fabric comprising a first end contacting the second switch and a second end contacting the first computing unit; and
a second set of computing resources comprising a second computing unit connected to:
the first switch via a third resource connection of the fabric comprising a first end contacting the first switch and a second end contacting the second computing unit; and
the second switch via a fourth resource connection of the fabric comprising a first end contacting the second switch and a second end contacting the second computing unit, wherein the first host link supports a traffic bandwidth greater than or equal to a first total bandwidth required for the first set of computing resources to operate at full bandwidth, wherein the second host link supports a second traffic bandwidth greater than or equal to a second total bandwidth required for the second set of computing resources to operate at full bandwidth, wherein the first cross-connection supports at least a bandwidth based on the first total bandwidth and the number of interfaces, and wherein the second cross-connection supports at least a bandwidth based on the second total bandwidth and the number of interfaces.

2. The computing system of claim 1, wherein the first switch is connected to the third switch and the fourth switch of the computing system via the first cross-connection and a third-cross-connection of the fabric comprising a first end contacting the first switch and a second end contacting the third switch or the fourth switch, and wherein the second switch is connected to the third switch and the fourth switch of the computing system via the second cross-connection and a fourth cross-connection of the fabric comprising a first end contacting the second switch and a second end contacting the third switch or the fourth switch.

3. The computing system of claim 2, wherein a second group of switches comprises the third switch, the fourth switch, and additional switches, wherein the first switch is connected to the additional switches of the second group of switches of the computing system via first corresponding cross-connections of the fabric, and wherein the second switch is connected to the additional switches of the second group of switches of the computing system via second corresponding cross-connections of the fabric.

4. The computing system of claim 1, further comprising a fifth switch and a sixth switch, and wherein the first switch is connected to at least one of the fifth switch or the sixth switch, wherein the second switch is connected to at least one of the fifth switch or the sixth switch, wherein the third switch is connected to at least one of the fifth switch or the sixth switch, and wherein the fourth switch is connected to at least one of the fifth switch or the sixth switch.

5. The computing system of claim 4, wherein the first switch is connected to the fifth switch and the sixth switch, wherein the second switch is connected to the fifth switch and the sixth switch, wherein the third switch is connected to the fifth switch and the sixth switch, and wherein the fourth switch is connected to the fifth switch and the sixth switch.

6. The computing system of claim 1, further comprising:
a first server node comprising the first interface; and
a second server node comprising the second interface.

7. The computing system of claim 6, wherein:
the third switch is:
connected to the first switch via the first cross-connection; and
connected to the second switch via the second cross-connection; and
a third server node comprising a third interface, the third interface being connected to the third switch via a third host link.

8. The computing system of claim 7, further comprising:
a first secondary switch connected to the first server node;
a second secondary switch connected to the second server node;
a third secondary switch connected to the third server node;
a first secondary cross-connection connecting the first secondary switch to the second secondary switch;
a second secondary cross-connection connecting the first secondary switch to the third secondary switch; and
a third secondary cross-connection connecting the second secondary switch to the third secondary switch.

9. The computing system of claim 7,
wherein a first set of computing resources comprises the first computing unit and a first set of data storage devices comprising:
a first data storage device having a first port connected to the first switch via the first resource connection and a second port connected to the second switch via the second resource connection; and
a second data storage device having a first port connected to the first switch via the first resource connection and a second port connected to the second switch via the second resource connection, and
wherein a second set of computing resources comprises the second computing unit and a second set of data storage devices comprising:
a third data storage device having a first port connected to the first switch via the third resource connection and a second port connected to the second switch via the fourth resource connection; and
a fourth data storage device having a first port connected to the first switch via the third resource connection and a second port connected to the second switch via the fourth resource connection.

10. The computing system of claim 9, wherein the fourth switch is connected to the first switch via a third cross-connection and connected to the second switch via a fourth cross-connection.

11. The computing system of claim 10, further comprising a third set of data storage devices comprising:
a fifth data storage device having a first port connected to the third switch via a fifth resource connection of the fabric comprising a first end contacting the first port and a second end contacting the third switch and a second port connected to the fourth switch via a sixth resource connection of the fabric comprising a first end contacting the second port and a second end contacting the fourth switch; and
a sixth data storage device having a first port connected to the third switch via the fifth resource connection further comprising a first end contacting the first port and a second end contacting the third switch and a second port connected to the fourth switch via the sixth resource connection further comprising a first end contacting the second port and a second end contacting the fourth switch.

12. The computing system of claim 11, further comprising:
a fourth server node connected to the fourth switch via a fourth host link; and
a fourth set of data storage devices comprising:
a seventh data storage device having a first port connected to the third switch via a seventh resource connection of the fabric comprising a first end contacting the first port and a second end contacting the third switch and a second port connected to the fourth switch via an eighth resource connection of the fabric comprising a first end contacting the second port and a second end contacting the fourth switch; and an eighth data storage device having a first port connected to the third switch via the seventh resource connection and a second port connected to the fourth switch via the eighth resource connection.

13. The computing system of claim 9, wherein at least one switch among the first switch, the second switch, the third switch, or the fourth switch is configured to:
detect a failure of another switch; and
provide access to the first set of data storage devices and the second set of data storage devices via at least one of the first host link or the second host link and at least one of the first cross-connection or the second cross-connection.

14. The computing system of claim 1,
wherein the computing system comprises N interfaces, where N is an integer,
wherein a bandwidth unit B is an amount of bandwidth required for one computing resource of a set of computing resources to operate at full bandwidth, where B is a positive number,
wherein the first resource connection has a bandwidth of at least 1×8,
wherein the second resource connection has a bandwidth of at least 1×8,
wherein the third resource connection has a bandwidth of at least 1×8,
wherein the fourth resource connection has a bandwidth of at least 1×8,
wherein the first set of computing resources comprising the first computing unit has up to K computing resources, where K is an integer,
wherein the second set of computing resources comprising the second computing unit has up to K computing resources,
wherein the first host link supports a normal traffic bandwidth of K×B and a maximum traffic bandwidth greater than or equal to K×B,
wherein the second host link supports a normal traffic bandwidth of K×B and a maximum traffic bandwidth greater than or equal to K×B,
wherein the first cross-connection has a bandwidth of at least K×B/(N−1), and
wherein the second cross-connection has a bandwidth of at least K×B/(N−1).

15. The computing system of claim 1, wherein the first computing unit comprises a computing unit selected from the group consisting of:
a vector processor;
a graphical processing unit;
and
a field programmable gate array.

16. A redundant resource connection fabric comprising:
a plurality of interfaces comprising a first interface and a second interface;
a first switch;
a second switch;
a third switch connected to the first switch via a first cross-connection and connected to the second switch via a second cross-connection;
a first computing unit connected to:
the first switch via a first resource connection of a fabric comprising a first end contacting the first switch and a second end contacting the first computing unit; and
the second switch via a second resource connection of the fabric comprising a first end contacting the second switch and a second end contacting the first computing unit; and a second computing unit connected to:
the first switch via a third resource connection of the fabric comprising a first end contacting the first switch and a second end contacting the second computing unit; and
the second switch via a fourth resource connection of the fabric comprising a first end contacting the second switch and a second end contacting the second computing unit,
wherein the redundant resource connection fabric further comprises a plurality of interfaces;
wherein a host link of the plurality of interfaces supports a total bandwidth greater than or equal to a first total bandwidth required for a first set of computing resources comprising the first computing unit to operate at full bandwidth and greater than or equal to a second total bandwidth required for a second set of computing resources comprising the second computing unit to operate at full bandwidth,
wherein the first cross-connection supports at least a bandwidth based on the total bandwidth and the number of interfaces, and
wherein the second cross-connection supports at least a bandwidth based on the total bandwidth and the number of interfaces.

17. The redundant resource connection fabric of claim 16, further comprising a fourth switch, wherein the first switch is connected to the third switch and the fourth switch and the second switch is connected to the third switch and the fourth switch via corresponding cross-connections.

18. The redundant resource connection fabric of claim 16, further comprising:
a fourth switch;
a third cross-connection comprising a first end contacting the first switch and a second end contacting the fourth switch;
a fourth cross-connection comprising a first end contacting the second switch and a second end contacting the fourth switch; and
a fifth cross-connection comprising a first end contacting the third switch and a second end contacting the fourth switch.

19. The redundant resource connection fabric of claim 16, further comprising:
a third computing resource connected to the third switch via a fifth resource connection comprising a first end contacting the third computing resource and a second end contacting the third switch.

20. The redundant resource connection fabric of claim 16, wherein the third switch is configured to:
detect a failure of the first switch; and
provide access to the first computing unit and the second computing unit via the second cross-connection.

21. The redundant resource connection fabric of claim 16, further comprising N interfaces, where N is an integer,
wherein a bandwidth unit B is an amount of bandwidth required for one computing resource to operate at full bandwidth, where B is a positive number,
wherein the first resource connection has a bandwidth of at least 1×8,
wherein the second resource connection has a bandwidth of at least 1×8, wherein the third resource connection has a bandwidth of at least 1×8, wherein the fourth resource connection has a bandwidth of at least 1×8, wherein the first set of computing resources comprising the first computing unit has up to K computing resources, where K is an integer, wherein the second set of computing resources comprising the second computing unit has up to K computing resources, wherein a host link of the N interfaces supports a normal traffic bandwidth of K×B and a maximum traffic bandwidth greater than or equal to K×B, wherein the first cross-connection has a bandwidth of at least K×B/(N−1), and wherein the second cross-connection has a bandwidth of at least K×B/(N−1).

22. The redundant resource connection fabric of claim 16, wherein the first computing unit comprises a computing unit selected from the group consisting of:

a vector processor;
a graphical processing unit;
and
a field programmable gate array.

* * * * *